United States Patent
Marschke et al.

(10) Patent No.: US 9,511,444 B2
(45) Date of Patent: Dec. 6, 2016

(54) DIGITAL COMMUNICATION BASED ARC CONTROL WELDING SYSTEM AND METHOD

(75) Inventors: Bryan Dustin Marschke, Kimberly, WI (US); James Donald Borowski, Greenville, WI (US); Peter D. Mehn, Oshkosh, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 623 days.

(21) Appl. No.: 13/530,610

(22) Filed: Jun. 22, 2012

(65) Prior Publication Data

US 2013/0015169 A1    Jan. 17, 2013

Related U.S. Application Data

(60) Provisional application No. 61/508,413, filed on Jul. 15, 2011.

(51) Int. Cl.
   *B23K 9/10* (2006.01)
   *B23K 9/12* (2006.01)
   *B23K 9/167* (2006.01)
   *B23K 9/173* (2006.01)

(52) U.S. Cl.
   CPC ............. *B23K 9/124* (2013.01); *B23K 9/1062* (2013.01); *B23K 9/167* (2013.01); *B23K 9/173* (2013.01)

(58) Field of Classification Search
   CPC ............................ B23K 9/1062; B23K 9/167
   USPC ................ 219/130.01, 130.5, 132, 133, 141
   See application file for complete search history.

(56) References Cited

U.S. PATENT DOCUMENTS

| | | |
|---|---|---|
| 6,121,575 A | 9/2000 | Ott |
| 6,278,082 B1 | 8/2001 | Shimogama |
| 6,335,511 B1 | 1/2002 | Rothermel |
| 6,700,097 B1 | 3/2004 | Hsu |
| 6,717,108 B2 | 4/2004 | Hsu |
| 6,734,394 B2 | 5/2004 | Hsu |
| 7,049,547 B1 | 5/2006 | Brunner et al. |
| 8,455,794 B2 | 6/2013 | Vogel |
| 9,012,807 B2 | 4/2015 | Ott |
| 2002/0168937 A1* | 11/2002 | Clark et al. .................... 455/41 |
| 2004/0079740 A1* | 4/2004 | Myers et al. ............ 219/130.51 |
| 2005/0258154 A1 | 11/2005 | Blankenship |
| 2007/0080154 A1* | 4/2007 | Ott et al. ...................... 219/132 |
| 2008/0011727 A1 | 1/2008 | Peters |

(Continued)

FOREIGN PATENT DOCUMENTS

| | | |
|---|---|---|
| CN | 1559737 | 1/2005 |
| CN | 1616929 | 5/2005 |

(Continued)

OTHER PUBLICATIONS

International Search Report from PCT application No. PCT/US2012/046715 dated Nov. 15, 2012, 12 pgs.

*Primary Examiner* — Thien S Tran
(74) *Attorney, Agent, or Firm* — Fletcher Yoder P.C.

(57) ABSTRACT

A welding system includes components equipped with digital communications circuitry for synchronization and coordination of tasks associated with the welding operation. The tasks may be initiated and terminated independently or in coordination based upon synchronization of this circuitry. Certain of the tasks may be performed by the components in an open-loop manner or in a closed-loop manner based upon feedback of welding parameters. Moreover, certain tasks may be independent of one another, or interdependent although carried out in parallel by the different system component.

20 Claims, 3 Drawing Sheets

(56) References Cited

U.S. PATENT DOCUMENTS

| | | | |
|---|---|---|---|
| 2009/0141699 A1* | 6/2009 | Goshen et al. | 370/350 |
| 2009/0298024 A1* | 12/2009 | Batzler et al. | 434/234 |
| 2010/0314369 A1* | 12/2010 | Kaufman | B23K 9/124 |
| | | | 219/130.1 |

FOREIGN PATENT DOCUMENTS

| | | |
|---|---|---|
| CN | 1718349 | 1/2006 |
| EP | 9834751 | 8/1998 |
| JP | H0623550 | 2/1994 |
| RU | 2077415 | 4/1997 |

* cited by examiner

DIGITAL COMMUNICATION BASED ARC CONTROL WELDING SYSTEM AND METHOD

CROSS REFERENCE TO RELATED APPLICATIONS

This application is a Non-Provisional patent application of U.S. Provisional Patent Application No. 61/508,413, entitled "Digital Communication Based Arc Control Welding System and Method", filed Jul. 15, 2011, which is herein incorporated by reference.

BACKGROUND

The invention relates generally to welding systems, and more particularly to improved techniques for effective control of welding arcs through digital control and coordination of system components.

A number of welding systems and processes have been developed and are currently in use. In general, these involve creation of an arc between an electrode and a work piece, which serves to melt filler metal and the work piece. These refuse to establish the desired joint. In some processes, such as gas metal arc welding (GMAW), a subset of which is commonly called metal inert gas (MIG) welding, flux-cored arc welding (FCAW), and shielded metal arc welding (SMAW), commonly called "stick" welding, the electrode itself is melted and becomes part of the weld. In other processes, such as gas tungsten arc welding (GTAW), commonly called tungsten inert gas (TIG), an electrode is not melted, but serves only to sustain an arc that melts the work piece and separate adder metal, when used.

In all of these welding processes, power supplies are used, along with other components, the construction and operation of which may vary based upon the type of process, and the way it is carried out. For example, in MIG systems, a power supply is generally coupled to a wire feeder that provides a controlled supply of welding wire electrode through a welding gun. The power supply or wire feeder is also typically coupled to a supply of shielding gas. In both MIG and TIG systems, moreover, the power us ultimately supplied to a welding gun or torch, used to complete the electrical circuit for the welding arc.

Control of such welding systems is typically based on feedback of various measured parameters, with open loop control of others. For example, currents and/or voltages are often measured, and used as a basis for closed loop control of pulses, output power levels, and so forth, as dictated by the particular welding regime selected. Other settings, such as wire feed speeds, may be essentially open loop, although there, too, tachometer readings, motor drive voltages, and similar parameters may be sensed and/or controlled in closed loop manners.

Conventional control schemes of this type, while very effective in providing high quality welds, are subject to certain drawbacks. In particular, the reliance of feedback for much of the process control makes the systems inherently reactive, resulting in delays that simply cannot be avoided due to the nature of the communication and control approach. Only limited improvements can be made, such as through faster signal transfer, higher processing speeds, and so forth, although these too have inherent limits.

There is a need, therefore, for improved techniques for control of welding processes that can reduce delays and improve the welding operations.

BRIEF DESCRIPTION

The present invention provides a novel approach to welding system control designed to respond to such needs. The approach is based upon synchronization of operations of welding components, thereby leading to more determinative control in which certain operations can be scheduled rather than performed based on feedback of sensed parameters. To be sure, the system may, and typically will, make use of parameter sensing and feedback, followed by computations and closed loop control, as in conventional welding systems, but the ability to schedule events by virtue of the proposed synchronization may greatly facilitate the performance of many tasks in the welding operation. These may be performed by the different synchronized components, scheduled to operate in parallel, with tasks and closed loop control being advanced following certain scheduled operations. It is believed that many options and future innovations may flow from the synchronization of the welding system components, particularly once these are freed, at least somewhat, from reactive-only closed loop control.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
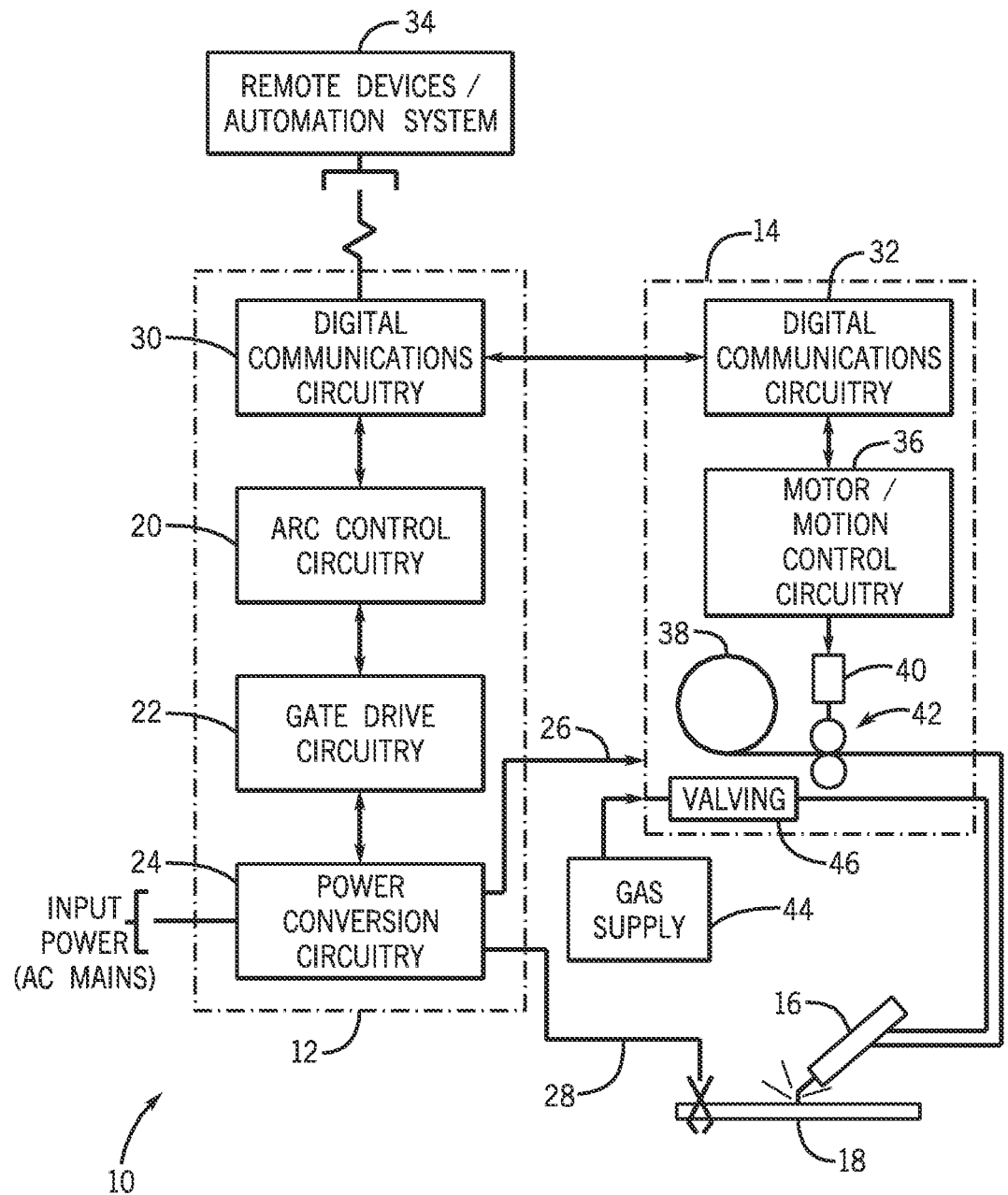
FIG. 1 is a diagrammatical representation of a welding system designed for coordinated synchronization and coordinated operation of system components in accordance with the present disclosure.

Turning now to the drawings, FIG. 1 represents an exemplary welding system 10 in which synchronization and coordinated tasks may be implemented for welding operations. The welding system 10 is illustrated as including a welding power supply 12 and a wire feeder 14. The welding power supply and the wire feeder provide power and welding services to a welding gun or torch 16. In operation, power and welding wire are supplied, along with shield and gas, depending upon the application, so as to execute a weld on a work piece 18.

It should be noted, although a MIG welding system is illustrated in FIG. 1, the present techniques may be employed with any welding system, welding process, and welding component. Thus, TIG systems, stick systems, and so forth may utilize similar techniques based upon the present disclosure. Moreover, processes may include constant current processes, constant voltage processes, pulse processes, and so forth, and a number of different material transfer modes may be accommodated, such as short circuit transfer, spray transfer, globular transfer, and so forth.

In the illustrated embodiment the welding power supply 12 comprises arc control circuitry 20 coupled to gate drive circuitry 22. The arc control circuitry is designed to control a welding arc established between the welding electrode and the work piece, particularly based upon the synchronized and coordinated control described in the present discussion.

In practice, the arc control circuitry may be part of a controller that performs a number of other functions in the power supply and the welding system. The arc control circuitry will typically include a microprocessor or digital signal processor and associated memory. The memory stores pre-defined welding processes, welding parameters, weld settings, and so forth utilized by the arc control circuitry throughout the welding processes. The gate drive circuitry 22 receives signals from the arc control circuitry to regulate conductive states of power electronic power devices within power conversion circuitry 24. Power control circuitry 24 will be coupled to a source of electrical power, such as the power grid, an engine-drive generator, batteries, fuel cells, or any other suitable power source. In operation, based upon the process implemented by the arc control circuitry 20, the gate drive circuitry 22 will be commanded to provide drive signals to power electronic switches within the power conversion circuitry to generate suitable power for welding. As will be appreciated by those skilled in the art, such devices may include SCRs, IGBTs, and/or any other suitable devices. Moreover, the power conversion circuitry may be of the type generally found in such systems, including boost converters, buck converters, power transformers, and so forth. Power created by the power conversion circuitry is conveyed to the wire feeder as indicated at reference numeral 26, and to a work cable 28 which will typically be coupled to the work piece or to a fixture in which the work piece is positioned.

The welding power supply further includes digital communications circuitry 30 designed to provide synchronized operation with other welding system components, such as the wire feeder. The digital communication circuitry may be provided independently of the arc control circuitry 20, or may be incorporated with the arc control circuitry into a single support, circuitry board, and the like. The digital communications circuitry 30 allows for communication of welding parameters, commands, feedback, and so forth between the welding power supply and other system components. The circuitry may be adapted to operate in accordance with known digital communications protocols for such communications. In the illustrated embodiment, the digital communications circuitry 30 of the power supply communicates with similar digital communications circuitry 32 of the wire feeder. The two devices allow for synchronization of the operation of the power supply and wire feeder and will typically include their own clocks providing signals which may form the basis for this synchronization. In certain embodiments, synchronization may be performed in circuitry without separate clocks. In a presently contemplated embodiment, the communications circuitry is synchronized at least every millisecond, although other periods or frequencies of synchronization may be used.

It should also be noted that a welding power supply 12 will typically also include an operator interface (not shown) that allows for user selection of welding processes, weld settings, weld parameters, and so forth, such as current and voltage. Such parameters may be conveyed to the arc control circuitry 20, stored in memory, and so forth for use in controlling the welding operation. As also illustrated in FIG. 1, the digital communication circuitry 30 may allow for communication to remote devices/automation systems 34. Thus, although a manual MIG system is illustrated, the present techniques may be employed with automated (e.g., robotic) systems in which welding may be fully or partially automated based upon the pre-established programming.

The wire feeder 14 includes motor/motion control circuitry 36 coupled to the digital communications circuitry 32. In many applications the motor/motion control circuitry 36 will include a separate microprocessor or digital signal processor capable of carrying out operations coordinated with the welding power supply as described below. Such processors will be associated with memory (not separately shown) which may store operational programming, calibration settings, weld settings, operator-input preferences, and so forth. In general, these will include, for example, a wire feed speed, but they may also include wire types, and the like. The motor/motion control circuitry 36 is configured to drive a wire from a spool 36 by commanding operation of a motor 40 coupled to a drive assembly 42. Such control signals may, for example, take the form of variable voltage signals, and will depend upon the nature of motor 40 and the other components of the system. The wire feeder 14 is also coupled to a gas supply 44 for providing shield and gas for the welding operation. Accordingly, a valve 46 is provided for allowing a flow of gas to be provided to the welding torch, and for interrupting the flow. In certain embodiments, the valve may also allow for some degree of metering. In the illustrated embodiment, the valve is controlled by the control circuitry 36.

Figure 2:
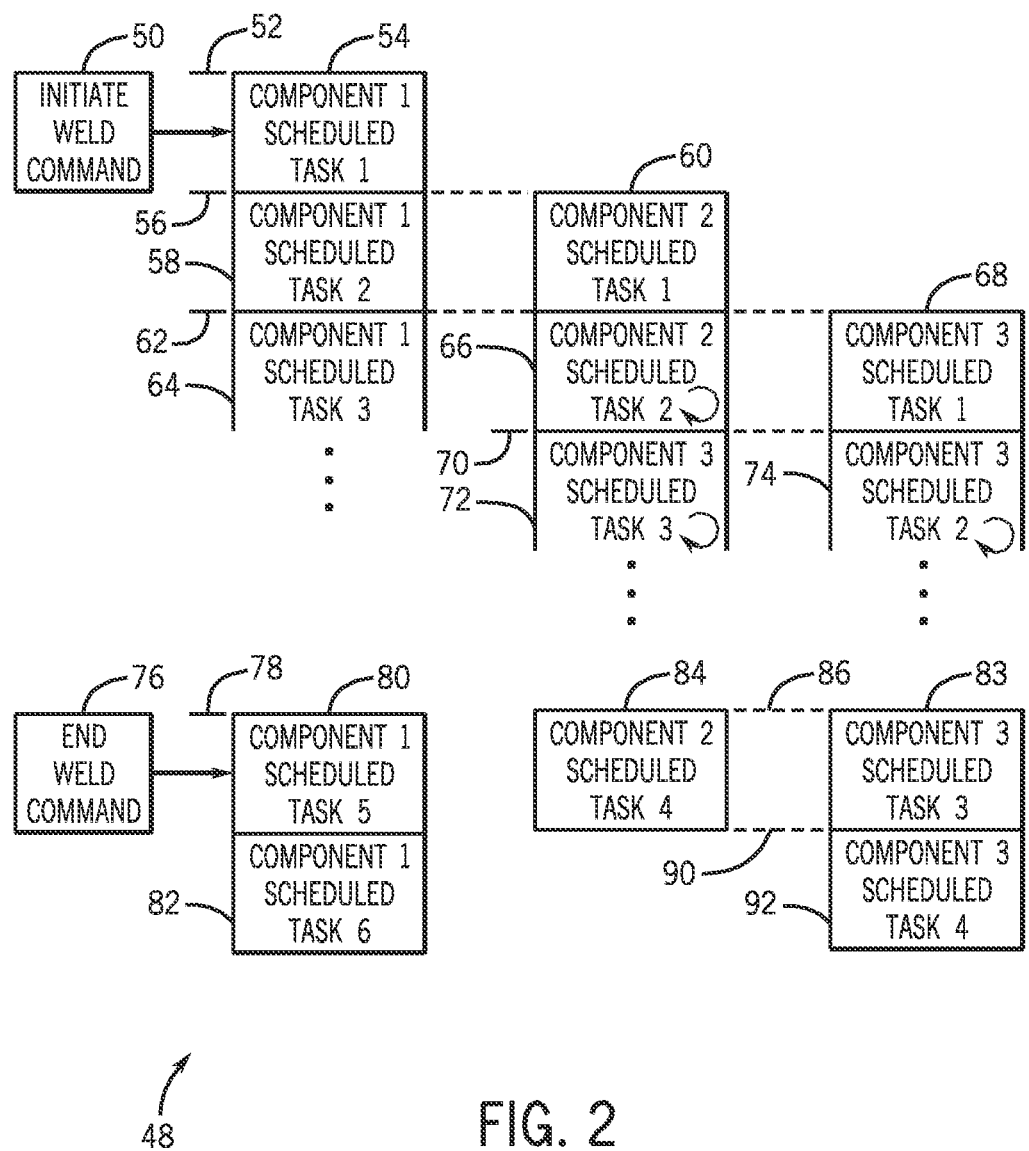
FIG. 2 is a flow chart or timing diagram illustrating execution of tasks on various welding system components of the time illustrated in FIG. 1.

In operation, the system of FIG. 1 is synchronized by communication between the digital communications circuitry such that welding operations may be broken into tasks that can be coordinated between the welding system components. That is, whereas in conventional systems operations are typically performed either in an open-loop manner or in a closed-loop manner based upon feedback, at least some of the tasks performed by the components of the welding system as described herein can be performed on a scheduled basis. FIG. 2 represents circuitry tasks performed on a welding system of the type illustrated in FIG. 1 in a synchronized and coordinated manner.

As shown in FIG. 2, a welding operation 48 is typically initiated by a command as indicated by reference numeral 50. This command may correspond to an operator depressing a trigger on a welding gun, but may also comprise initiation of a welding arc in a stick process or the receipt of a command from a remote device, such as for automated operations. The receipt of the command begins the welding operation as indicated at time 52. In the diagram of FIG. 2, several components are illustrated as performing tasks, some coordinated with other tasks, and others independent of other tasks. In this illustration, a first component begins a first task at time 52 as indicated by block 54. This task is illustrated as lasting until time 56 at which time a second task is initiated by the first component as indicated at reference numeral 58. It is contemplated that during these times coordination will be made between other system components by synchronization of circuitry, such as the communication circuitry discussed above. In the illustrated embodiment, therefore, a second component begins a first scheduled task as indicated at block 60. Tasks 58 and 60 continue in parallel until time 62. At time 62, the first component carries on a third task 64, while the second component begins a second task 66. At the same time, a third component begins its first task as indicated at block 68.

Following these initialed tasks, the first component is shown to continue the third task indefinitely while at times 70 the second and third components begin tasks 72 and 74 respectively. This point in the control may correspond to steady state welding conditions in the welding operation.

Several observations should be made regarding the synchronization and coordination of these tasks. First, certain of the tasks may be scheduled and coordinated to begin and/or end at the same time. However, certain tasks may end earlier that other tasks performed by other components, and the component with the task ending earlier may be instructed to wait until a task is completed by another component. For example, task 58 may be completed prior to task 60, but component 1 may be instructed to wait until completion of task 60 to begin its subsequent task 64. Moreover, it should be noted that some these tasks may be open-loop operations in which a component is turned off or on, or is commanded to operate at a pre-determined level. Other tasks may be closed-loop, typically based upon feedback of one or more sensed weld parameters as in current welding systems. This closed-loop operation is illustrated in FIG. 2 by the cyclical arrows in tasks 66, 72 and 74. It should be noted, however, that these are merely illustrative, and any one of the tasks may be at least partially closed-loop for the particular component. Moreover, any one of the tasks may be completely independent of other component tasks, or these may be substantially interdependent. That is, for example, the third task of component 2, indicated by reference numeral 72, may utilize feedback that is also utilized by component 3 in performing its scheduled task 74. Such interdependence may be common in certain phases of the welding operation, such as for coordinated wire feed and power control. For coordinated operation, the components may communicate, via the digital communications circuitry, the state of the various tasks, particularly when certain tasks are to begin only after completion of other tasks on other components.

As further illustrated in FIG. 2, at some point a command will be received to end the welding operation as indicated at reference numeral 76. Depending upon the system type and the process performed, this may consist of an operator releasing a welding torch trigger, moving a torch or stick away from a work piece to terminate an arc, or an automated command received from a remote device (e.g., to terminate a weld after reaching a desired location on a work piece). In the illustration of FIG. 2, this command is received at time 78, at which the first component begins a scheduled task 80 to begin termination of the welding operation. Following termination of this task, the component performs its final task 82. Separately from the performance of the scheduled tasks by the first component, the second component may begin its last scheduled task at time 86, somewhat after time 78 to begin termination of the welding operation. In the illustrated embodiment, the third component also begins a task at this stage as indicated by reference numeral 88. These two tasks are illustrated as being completed at time 90 and a final task is then performed by the third component as indicated at reference numeral 92. Here again, some or all of these tasks may open-loop or closed-loop based upon sensed welding parameters. Following completion of all tasks, the welding operation is terminated.

Throughout the processes outlined in FIG. 2, synchronization of the welding components takes place. Thus, within the time horizon of the synchronization, the various tasks may be easily coordinated. It should be noted that the command of the tasks may originate in control circuitry of each individual component, or certain components may command operation of others. However, the present techniques contemplate at least two components having circuitry permitting synchronization and coordinated tasks. It should also be noted that some or all of the tasks may be commanded by remote devices, such as that illustrated in FIG. 1, particularly for automated applications. Still further, the tasks performed by the welding system components, particularly in automated settings, may be coordinated with tasks performed by other machine systems, such as to begin and end welding operations at particular positions and times based upon location and readiness work pieces, assemblies, and the like on assembly lines and in weld cells.

Figure 3:
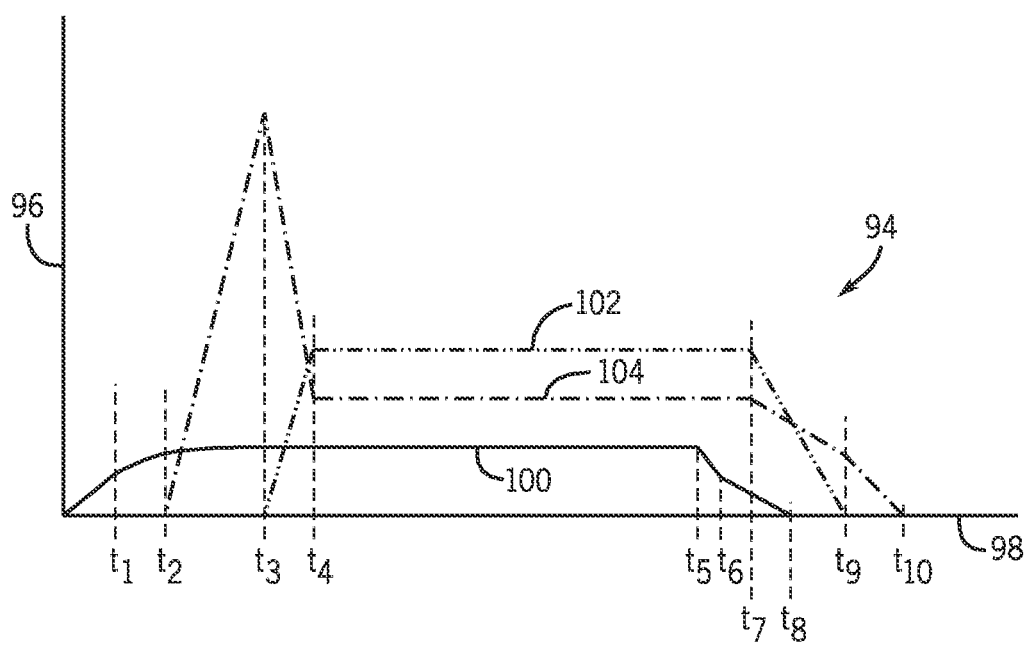
FIG. 3 is a graphical representation of timing of events coordinated in accordance with FIG. 2.

FIG. 3 is a graphical representation of an exemplary welding process 94 of the type summarized in FIG. 2. FIG. 3 represents the welding process in terms of a magnitude or state of the components along access 96 and a time along access 98. In the illustration of FIG. 3, trace 100, then, represents flow of shield and gas under the control of valving (here "component 1"), trace 102 indicates welding wire feed (via control of the wire feed motor and assembly, here "component 2"), while trace 104 represents the voltage output of the power supply (via control of the power conversion circuitry, here "component 3"). As can be seen in the figure, tasks are initiated and completed at particular times for the desired welding operation.

In particular, at time t0, the welding operation is initiated by the receipt of a command as described above. From this point, a pre-flow of shield and gas is begun by control of the gas valve. This task may be performed open-loop and for a predetermined length of time, followed by a change in the flow rate of the gas as a second task between times t1 and t2. At time t2, then, the flow of shield and gas will have reached a steady state level and is not further changed (generally corresponding to the third task 64 illustrated in FIG. 2). Also at time t2, voltage output of the power supply is significantly increased to anticipate initiation of the welding arc. At time t3 the voltage reaches a peak and welding wire feed is begun as indicated by trace 102. Between times t3 and t4, the welding power supply will continue increasing the wire feed rate, and ultimately an arc will be established during this period. Upon establishment of the arc, the voltage may be reduced as indicated by trace 104. Here it should be noted that one or both of these operations may be performed in a closed-loop manner upon detection of currents and/or voltages that indicate the establishment of the welding arc. At time t4, then, the wire feed speed and voltage will reach a steady state level, and the welding operation will proceed.

It should be noted that, as mentioned above, any of these tasks and operations may be substantially interdependent. For example, in certain cases, the wire feed speed may be coordinated with the initiation of the arc and the application of power to sustain the arc. While not illustrated specifically in FIG. 3, many variations on these tasks, with and without feedback control and interdependence between the tasks may be envisaged.

In the illustration of FIG. 3, the welding operation continues until time t5 where a signal is received to terminate the welding operation. This may correspond to, for example, a welding operation releasing a trigger on a welding torch. In the illustrated embodiment, this signal results in the beginning of a reduction in gas flow until time t6, followed by continuous reduction in gas flow until time t8. As will be appreciated by those skilled in the art, in such operations gas flow may be continued to sufficiently shield the cooling weld bead and weld puddle. Here this operation is performed somewhat independently of the operations performed that affect the wire feed and applied voltage.

At time t7 the rate of wire feed is ramped down, ultimately reaching a terminal point at time t9. The voltage is also ramped down until time t9, at which point the voltage is terminated as indicated at time t10. Here again, these operations may be interdependent, and may be based upon sentenced welding parameters.

Throughout such processes, it is believed that significant advantages can be obtained by the ability to schedule tasks of one or more of the welding system components either independently or dependently. The synchronization of the components allows for somewhat parallel operation that may rely at times upon feedback, and at times upon initiation points, terminal points, and so forth. Here again, within each of the tasks, open-loop or closed-loop operation may be implemented, in certain of these may be identical to those of conventional welding systems. However, the synchronization of the schedule-based tasks provides enhanced flexibility and reduces delays in the initiation and termination of certain operations during the welding operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
   a welding power supply configured to produce welding output power suitable for a welding operation and to perform a first task on the welding power supply that controls a portion of the welding operation in accordance with a schedule to weld a workpiece during the welding operation in a closed-loop manner based upon feedback of a welding parameter, the welding power supply comprising first digital communications circuitry configured to send and to receive welding parameters during the welding operation; and
   at least one other welding component coupled to the welding power supply and configured to perform a second task on the at least one other welding component that controls another portion of the welding operation in accordance with the schedule to weld the workpiece during the welding operation, the at least one other welding component comprising second digital communications circuitry configured to synchronize communication with the first digital communications circuitry, and to send and receive the welding parameters during the welding operation, wherein the at least one other welding component is configured to receive a state of the first task from the first digital communications circuitry, to wait until the first task is completed, and to begin the second task after completion of the first task based on the schedule in control circuitry of the welding power supply, the at least one other welding component, or any combination thereof.

2. The system of claim 1, wherein the digital communications circuitry is configured to send data to and to receive data from a remote automation system.

3. The system of claim 2, wherein the welding operation is at least partially commanded by the remote automation system.

4. The system of claim 1, wherein the digital communications circuitry is configured to synchronize at least every millisecond.

5. The system of claim 1, wherein each of the welding power supply and the at least one other welding component comprises respective processing circuitry configured to control tasks synchronized via the digital communications circuitry.

6. The system of claim 1, wherein the digital communications circuitry of the welding power supply is configured to communicate with the digital communications circuitry of the at least one other welding component communicate with one another via a conductor separate from a conductor used to convey power from the welding power supply.

7. The system of claim 1, wherein the digital communications circuitry of the welding power supply is configured to communicate with the digital communications circuitry of the at least one other welding component communicate with one another via a conductor used to convey power from the welding power supply.

8. The system of claim 1, wherein the digital communications circuitry of the welding power supply and the digital communications circuitry of the at least one other welding component are configured to communicate with one another wirelessly.

9. The system of claim 1, wherein the second task performed by the at least one other welding component depends upon a voltage, current, or combination thereof that is detected from the first task performed by the welding power supply.

10. The system of claim 1, wherein the second task performed by the at least one other welding component is performed in a closed-loop manner.

11. A system comprising:
    a welding power supply configured to produce welding output power suitable for a welding operation and to perform a first task on the welding power supply that controls a portion of the welding operation in accordance with a schedule at a first time to weld a workpiece during the welding operation in a closed-loop manner based upon feedback of a welding parameter, the welding power supply comprising first digital communications circuitry configured to send and to receive welding parameters during the welding operation; and
    at least one other welding component coupled to the welding power supply and configured to perform a second task on the at least one other welding component that controls another portion of the welding operation in accordance with the schedule to weld the workpiece during the welding operation, the at least one other welding component comprising second digital communications circuitry configured to synchronize communication with the first digital communications circuitry, and to send and receive the welding parameters during the welding operation wherein the at least one other welding component is configured to receive a state of the first task from the first digital communications circuitry, and to begin the second task at a different time than the first task based on the state of the first task and the schedule in control circuitry of the welding power supply, the at least one other welding component, or any combination thereof.

12. The system of claim 11, wherein the first task depends upon feedback associated with the at least one other welding component as an interdependence.

13. The system of claim 11, wherein the first and second tasks depend on a power characteristic of the welding power supply as an interdependence.

14. The system of claim 11, wherein the first and second tasks are synchronized based on a schedule.

15. A system comprising:
    at least one welding component configured to perform a first task on the at least one welding component that controls a portion of a welding operation in accordance with a schedule to weld a workpiece during the welding operation, the at least one welding component comprising first digital communications circuitry configured to send and to receive welding parameters during the welding operation; and
    a welding power supply coupled to the at least one welding component and configured to produce welding output power suitable for a welding operation and to perform a second task on the welding power supply that controls another portion of the welding operation in accordance with the schedule to weld the workpiece during the welding operation, the welding power supply comprising second digital communications circuitry configured to synchronize communication with the first digital communications circuitry and to send and receive welding parameters during the welding operation, wherein the at least one welding component is configured to perform the first task to weld the workpiece during the welding operation in a closed-loop manner, wherein the welding power supply is configured to receive a state of the first task from the first digital communications circuitry, to wait until the first task is completed, and to begin the second task after completion of the first task based on the schedule in control circuitry of the welding power supply, the at least one welding component, or any combination thereof.

16. The system of claim 15, wherein the second task is performed in a closed-loop manner.

17. The system of claim 15, wherein the first and second tasks are performed in parallel.

18. The system of claim 15, wherein the first and second digital communications circuitry are configured to communicate a state of various tasks.

19. The system of claim 15, wherein the schedule comprises data related to when certain tasks are to begin in relation to other tasks.

20. The system of claim 1, wherein the first task is scheduled to end at approximately the same time as the second task is scheduled to begin.

* * * * *